(12) United States Patent
Cox et al.

(10) Patent No.: US 8,090,095 B2
(45) Date of Patent: Jan. 3, 2012

(54) METHOD AND APPARATUS FOR POWER-MODE CONTROL

(75) Inventors: Edward W. Cox, Austin, TX (US); Ken D. Alton, Austin, TX (US)

(73) Assignee: Microsemi Semiconductor (U.S.) Inc., Ontario (CA)

( * ) Notice: Subject to any disclaimer, the term of this patent is extended or adjusted under 35 U.S.C. 154(b) by 1380 days.

(21) Appl. No.: 11/621,426

(22) Filed: Jan. 9, 2007

(65) Prior Publication Data

US 2008/0165763 A1    Jul. 10, 2008

(51) Int. Cl.
*H04M 1/00* (2006.01)
*H04M 9/00* (2006.01)

(52) U.S. Cl. ................................................ 379/413

(58) Field of Classification Search .................. 379/413
See application file for complete search history.

(56) References Cited

U.S. PATENT DOCUMENTS

| | | | |
|---|---|---|---|
| 5,754,644 A * | 5/1998 | Akhteruzzaman | 379/413 |
| 2005/0147049 A1 * | 7/2005 | Ganesan | 370/241 |

* cited by examiner

*Primary Examiner* — Alexander Jamal
(74) *Attorney, Agent, or Firm* — Williams, Morgan & Amerson, P.C.

(57) ABSTRACT

A method, apparatus, and system are provided for controlling the power-mode of a telephonic device. An off-hook condition is detected. A power level for an operation of an electronic device is determined based upon detecting the off-hook condition. Determining the power level includes determining a frequency parameter and/or a pulse-width parameter of a power signal. The power signal is provided for an operation of the electronic device based upon the determined power level.

27 Claims, 5 Drawing Sheets

METHOD AND APPARATUS FOR POWER-MODE CONTROL

BACKGROUND OF THE INVENTION

1. Field of the Invention

This invention relates generally to telecommunications, and, more particularly, to performing off-hook detection and control of power-mode.

2. Description of the Related Art

In communications systems, particularly telephony such as a Plain Old Telephone System (POTS), it is common practice to transmit signals between a subscriber station and a central switching office via a two-wire, bi-directional communication channel. A line card generally connects the subscriber station to the central switching office. The functions of the line card include supplying talk battery, performing wake-up sequences of circuits to allow communications to take place, and the like. Voltage signals are processed and conditioned when being driven onto telecommunication lines.

POTS was designed primarily for voice communication, and thus provides an inadequate data transmission rate for many modern applications. To meet the demand for high-speed communication, designers have sought innovative and cost-effective solutions that would take advantage of the existing network infrastructure. Several technological solutions proposed in the telecommunications industry use the existing network of telephone wires. A promising one of these technologies is the Digital Subscriber Line (xDSL or DSL) technology.

xDSL is making the existing network of telephone lines more robust and versatile. Once considered virtually unusable for broadband communications, an ordinary twisted pair equipped with DSL interfaces can transmit video, television, and very high-speed data. The fact that more than six hundred million telephone lines exist around the world is a compelling reason for these lines to be used as the primary transmission conduits for at least several more decades. Because DSL utilizes telephone wiring already installed in virtually every home and business in the world, it has been embraced by many as one of the more promising and viable options.

There are now at least three popular versions of DSL technology, namely Asymmetrical Digital Subscriber Line (ADSL), Very High-Speed Digital Subscriber Line (VDSL), and Symmetric Digital Subscriber Line (SDSL). Although each technology is generally directed at different types of users, they all share certain characteristics. For example, all four DSL systems utilize the existing, ubiquitous telephone wiring infrastructure, deliver greater bandwidth, and operate by employing special digital signal processing. Because the aforementioned technologies are well known in the art, they will not be described in detail herein.

DSL and POTS technologies can co-exist in one line (e.g., also referred to as a "subscriber line"). Traditional analog voice band interfaces use the same frequency band, 0-4 Kilohertz (KHz), as telephone service, thereby preventing concurrent voice and data use. A DSL interface, on the other hand, operates at frequencies above the voice channels, from 25 KHz to 1.1 Megahertz (MHz). Thus, a single DSL line is capable of offering simultaneous channels for voice and data. It should be noted that the standards for certain derivatives of ADSL are still in definition as of this writing, and therefore are subject to change.

DSL systems use digital signal processing (DSP) to increase throughput and signal quality through common copper telephone wire. It provides a downstream data transfer rate from the DSL Point-of-Presence (POP) to the subscriber location at speeds of up to 1.5 megabits per second (MBPS). The transfer rate of 1.5 MBPS, for instance, is fifty times faster than a conventional 28.8 kilobits per second (KBPS) transfer rate typically found in conventional POTS systems.

Telephonic communication devices may be integrated into various electronic devices, such as computers, for example. Digital communications via data network lines may be made possible by these telephonic communication devices. Some of these devices may be remote devices where power consumption is of concern. When a telephonic communications device is integrated with these electronic devices, power consumption may become problematic. In order to monitor for communication signals, a minimum amount of power is required. Generally, the telephonic communication devices may be able to detect a communications state, such as an off hook state to determine whether full communication operation should to be implemented. However, one of the problems associated with the prior art is that the output detection is a high power operation and consumes an undesirable amount of power.

Designers have attempted to alleviate some of these problems by providing for a voltage change when a communication event, such as the reception of a ringing signal, occurs. However, the switches utilized in the state of the art devices to perform this function are generally only capable of changing the output voltage to accommodate for different communication events. This causes an enormous amount of power consumption to occur during the detection and operation of the telephonic communication devices. A simple voltage change does not alleviate all of the power consumption concerns. Efficiency in switching between power modes is generally less than desirable when simply performing a voltage change or switch.

The present invention is directed to overcoming, or at least reducing the effects of, one or more of the problems set forth above.

SUMMARY OF THE INVENTION

In one aspect of the present invention, a method is provided for controlling the power-mode of a telephonic device. An off-hook condition is detected. A power level for an operation of an electronic device is determined based upon the detecting the off-hook condition. Determining the power level includes determining a frequency parameter and/or a pulse-width parameter of a power signal. The power signal is provided for an operation of the electronic device based upon the determined power level.

In another aspect of the present invention, an apparatus is provided for controlling the power-mode of a telephonic device. The apparatus of the present invention includes a telephonic device operationally coupled to an electronic device. The telephonic device is adapted to detect an off-hook status associated with the telephonic device. The telephonic device is also adapted to determine a frequency parameter and/or a pulse-width parameter of a power signal used for an operation of the electronic device based upon the off-hook indication. The telephonic device is also adapted to provide the power signal for an operation of the electronic device.

In another aspect of the present invention, a system is provided for controlling the power-mode of a telephonic device. The system of the present invention includes an electronic device capable of receiving a communication signal through a communication line. The system also includes a telephonic device operationally coupled to the electronic device. The telephonic device is adapted to detect an off-hook status associated with the telephonic device. The telephonic device is also adapted to determine a frequency parameter and/or a pulse-width parameter of a power signal used for an operation of the electronic device based upon the off-hook indication. The telephonic device is also adapted to provide the power signal for an operation of the electronic device.

In another aspect of the present invention, an apparatus is provided for controlling the power-mode of a telephonic device. The apparatus includes means for detecting an off-hook condition and means for determining a power level for an operation of an electronic device based upon the detecting the off-hook condition. The means for determining the power level includes means for determining a frequency parameter and/or a pulse-width parameter of a power signal. The apparatus also includes means for providing the power signal for an operation of the electronic device based upon the determined power level.

In yet another aspect of the present invention, a computer readable program storage device encoded with instructions is provided for controlling the power-mode of a telephonic device. The computer readable program storage device encoded with instructions that, when executed by a computer, performs a method, which comprises detecting an off-hook condition; determining a power level for an operation of an electronic device based upon the detecting the off-hook condition. Determining the power level includes determining a frequency parameter and/or a pulse-width parameter of a power signal. The method also includes providing the power signal for an operation of the electronic device based upon the determined power level.

BRIEF DESCRIPTION OF THE DRAWINGS

The invention may be understood by reference to the following description taken in conjunction with the accompanying drawings, in which like reference numerals identify like elements, and in which.

Figure 1:
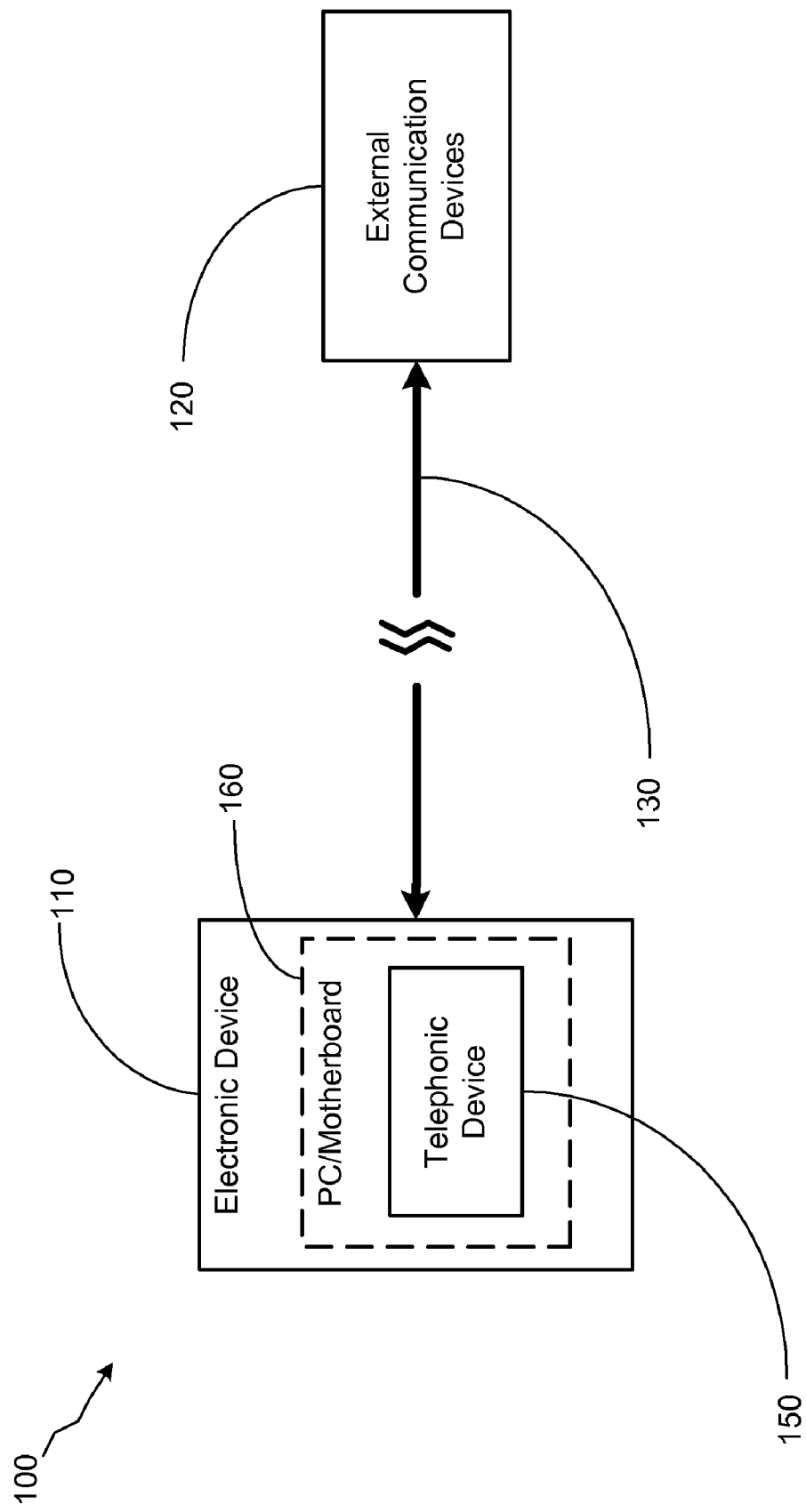
FIG. 1 illustrates a communications system in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Embodiments of the present invention provide for a power supply switching system, apparatus, and method to perform power-mode switching from a plurality of power sources. Embodiments of the present invention provide for a communication device e.g., a telephonic device, in a standalone mode, or alternatively in an integrated mode, wherein the communication device may be integrated into an electronic device, such as a "PC" computer system. The underlying electronic device, in which a telephonic device is integrated, may enter various power modes, such as a sleep-mode. During the sleep-mode of the electronic device, the telephonic device may also enter into a sleep mode to accommodate the multiple low power level operation-modes of the electronic device.

The telephonic device of the embodiments of the present invention provide for a novel switcher system that may allow the telephonic device to operate in a plurality of power modes provided by the electronic device (e.g., a low-power mode, for example, an "S3 Standby Mode"; a medium-power mode, for example, an "S1 Standby Mode"; and/or in a high-power or normal operating mode). The switcher provided by embodiments of the present invention may provide for a supplying low-voltage or current power supply during a sleep-mode, and may switch to a higher current or voltage power supply when the electronic device enters into a different operation-mode, such as a wake-up mode for normal operation. In this manner, embodiments of the present invention allow for the telephonic device to wake up the electronic device from a sleep-mode as a result of the telephonic device entering into an off-hook state when the electronic device was in a sleep-mode. In this manner, various power consumption and enhanced efficiencies provided by embodiments of the present invention may be realized.

Turning now to FIG. 1, a block diagram depiction of a system 100, in accordance with one illustrative embodiment of the present invention, is provided. The system 100 of FIG. 1 comprises an electronic device 110 that may be in communication with an external communication device 120. The electronic device 110 may be one of a variety of devices, such as a personal computer system ("PC" computer system), a remote communication device such as a cell phone, a personal digital assistant (PDA), an Apple® computer system, a mainframe computer system, a server, another telephonic device, a central office, a subscriber station, a network computer system (e.g., a computer associated with a local area network (LAN) line or a wide area network (WAN) line, and/or the like.

The electronic device 110 may comprise a telephonic device 150 capable of communications with one or more external communication devices 120. In one embodiment, the electronic device 110 may comprise a printed circuit board (PC board) 160. The PC board may be a motherboard 160 of the electronic device 110. In one embodiment the telephonic device 150 may be built or integrated onto the PC/motherboard 160. In another embodiment, the telephonic device 150 may be a standalone unit that is interfaced with the electronic device 110.

The telephonic device 150, which in one embodiment, may be a subscriber station and operatively connected to an external communications device 120, which may be a central office. Communications between the telephonic device 150 and the external communication device 120 may include sending and receiving signals comprising voice and/or data band. The voice band in one embodiment, refers to POTS voice signal ranging from 0-4 KHz. The data band, in one embodiment, may refer to frequencies above the voice band, and may include, for example, the frequency range employed in xDSL space technologies. In one embodiment, a communication line 130 may represent a subscriber line, which may be a public switched telephone network (PSTN) line, a private branch exchange (PBX) line, or any other media capable of transmitting signals. In an alternative embodiment the communication line 130 may represent a wireless type connection. The telephonic device 150 may comprise the switching functions capable of switching from various power modes in conjunction with the power mode operations of the electronic device 110.

The telephonic device 150 may be a device capable of supporting pulse dialing and/or tone dialing. The term "telephonic device," as utilized herein, includes a telephone, or any other device capable of providing a communication link between at least two users. In one embodiment, the telephonic device 150 may be one of a variety of available conventional telephones, such as wired telephones, wireless phones, etc. In an alternative embodiment, the telephonic device 150 may be any "device" capable of performing a substantially equivalent function of a conventional telephone, which may include, but is not limited to, transmitting and/or receiving voice and data signals. Examples of the telephonic device 150 include a data processing system (DPS) utilizing a modem to perform IP telephony, a television phone, a wireless local loop, a DPS working in conjunction with a telephone, Internet Protocol (IP) telephony, and the like. IP telephony is a general term for the technologies that use the Internet Protocol's packet-switched connections to exchange voice, fax, and other forms of information that have traditionally been carried over the dedicated circuit-switched connections of the public switched telephone network (PSTN). One example of IP telephony is an Internet Phone, a software program that runs on a DPS and simulates a conventional phone, allowing an end user to speak through a microphone and hear through DPS speakers. The calls travel over the Internet as packets of data on shared lines, avoiding the tolls of the PSTN.

Figure 2:
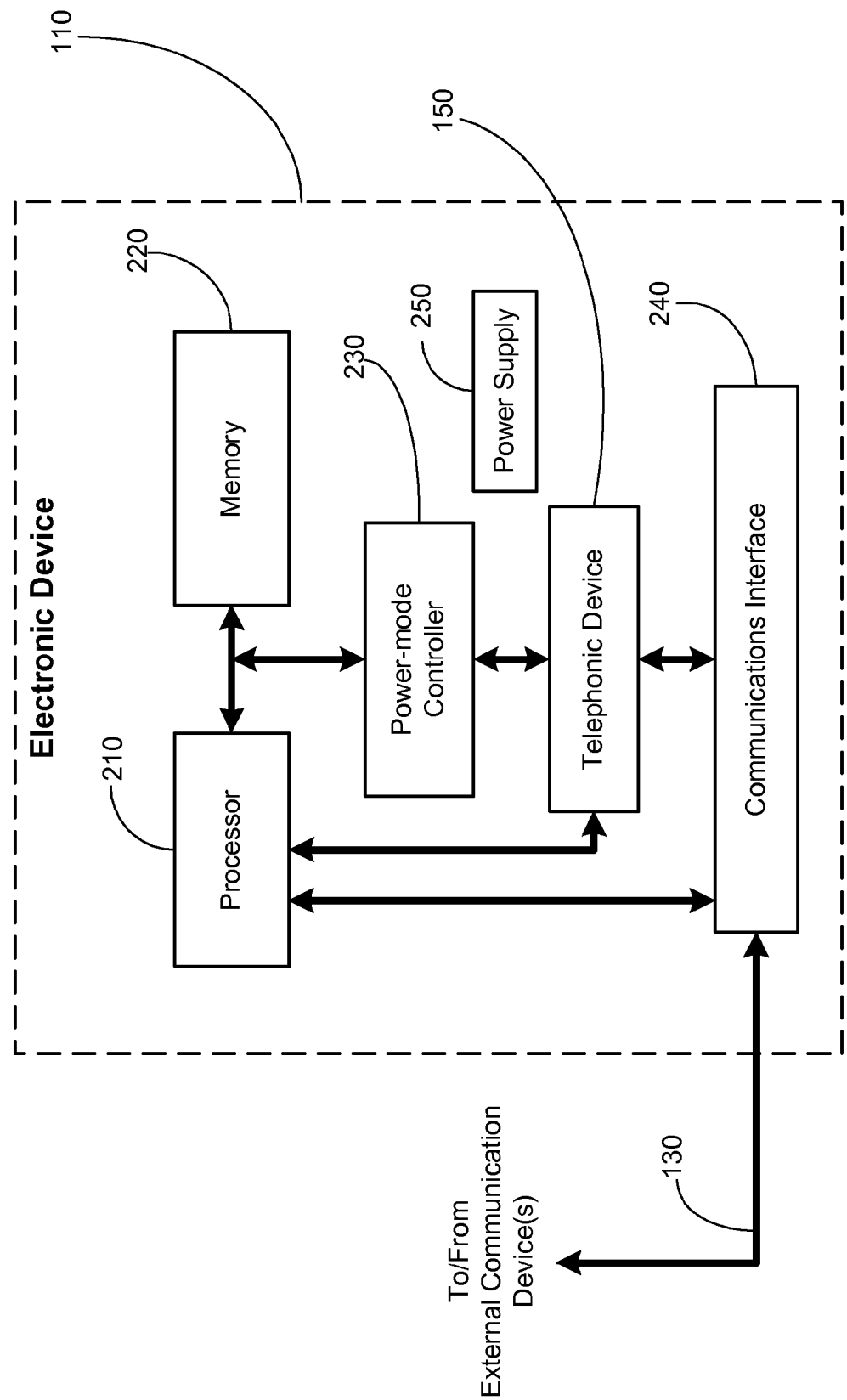
FIG. 2 illustrates a more detailed block diagram depiction of an electronic device of FIG. 1, in accordance with one illustrative embodiment of the present invention.

Turning now to FIG. 2, a more detailed block diagram depiction of the electronic device of FIG. 1, in accordance with one illustrative embodiment of the present invention is provided. For illustrative purposes, the electronic device is described in the context of a computer system. However, those skilled in the art would readily appreciate that a variety of different types of electronic devices may be used to host the telephonic device 150 and remain within the spirit and scope of the present invention.

The electronic device 110 may comprise a processor 210 that is capable of controlling various functions performed by the electronic device. The processor 210 may control various operations of the electronic device, including the operation of the telephonic device 150. The processor may include a state machine that is capable of controlling various activities of the electronic device 110, include the operation power-mode as well as various operations of the telephonic device 150.

The electronic device may also comprise memory 220. The memory may encompass a variety of types of memory, such as random access memory (RAM), dynamic random access memory (DRAM), read-only memory (ROM), hard drive memory, and/or other types of memory. The electronic device 110 may also comprise a power-mode controller 230. The power-mode controller 230 is capable of causing the electronic device 110 to enter into a variety of power modes, such as off-mode, sleep-mode, low-power mode ("S3 mode"), full-power mode, etc. For example, upon detecting an extended period of inactivity the electronic device 110 may place itself into a sleep-mode. The power-mode controller 230 is capable of changing the power-mode state of the telephonic device 150 based upon a variety of factors, such as a communication input via the external communication devices 120, or any other input received by the electronic device 110. The telephonic device 150 may operate in similar power modes based upon the operation of the electronic device 110.

Further, the telephonic device 150 may be capable of influencing the operation of the power mode controller 230. The electronic device 110 may also include a communications interface 240. The communications interface 240 may represent a variety of types of communications signal interfaces, such as a modem, e.g., an xDSL modem, an analog modem, network communication interface, etc. The communications interface 240 may receive external data or communication signals, which affect the operation of the telephonic device 150. Therefore, based upon external communications, the telephonic device 150 is capable of causing the electronic systems device 110 to change operation states, i.e., changing from a sleep-mode to a wake-up mode.

In one embodiment, the communications interface 240 is capable of providing communications between a central office or other types of external communication devices 120, and the telephonic device 150, which may be a subscriber station. In one embodiment, the communications interface 240 may be a DSL modem, which may link a central office to a subscriber's station. Because voice and/or data can be transmitted on the communication line 130, the signal received and transmitted by the telephonic device 150 may include voice and data band frequencies.

The electronic device 110 may also comprise a power supply 250, which may represent one or more power supplies. In an alternative embodiment, the power supply 250 may reside externally to the electronic device but in communication with the electronic device 110 to provide operational power. A more detailed description of the telephonic device 150 is provided in FIG. 3 and accompanying description below.

Figure 3:
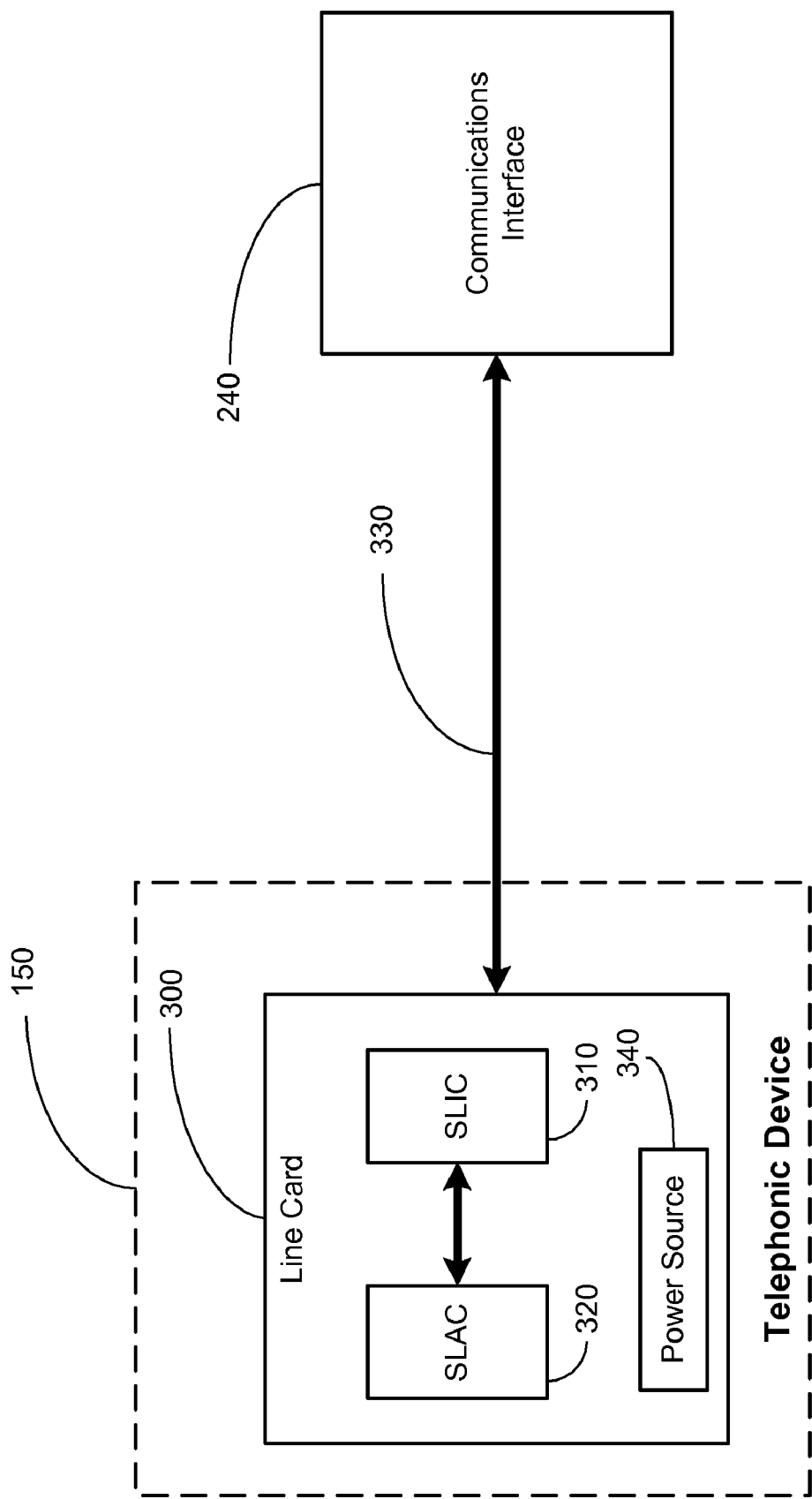
FIG. 3 illustrates a more detailed block diagram depiction of a telephonic device of FIG. 2, in accordance with one illustrative embodiment of the present invention.

Turning now to FIG. 3, a more detailed block diagram depiction of the telephonic device 150, in accordance with one illustrative embodiment of the present invention is provided. The telephonic device 150 may be in communications with the communications interface 240 via a line 330. The line 330 may represent a variety of types of communication links, such as a digital line, an analog line, a network line, an internal bus line, etc. The telephonic device 150, in one embodiment, may comprise a line card 300. In alternative embodiments, the line card 300 may be located in a central office or a remote location somewhere between the central office and the telephonic device 150, which may be a subscriber's station.

In one embodiment, the line card 300 illustrated in FIG. 3 may represent an integrated circuit (IC) device that includes the SLIC 310 and/or the SLAC 320. In an alternative embodiment, the SLIC 310 and/or the SLAC 320 may be separate entities or IC devices.

The line card 300 services the telephonic device 150. The line card 300 is capable of processing DC voltage signals and AC signals. The communications line 130 (e.g., subscriber line) in the instant embodiment is a telephone line. The combination of the telephonic device 150 and the telephone line (communication line 130) is generally referred to as a subscriber loop.

The line card 300, which may be capable of supporting a plurality of communication lines 130, performs, among other things, two fundamental functions: DC loop supervision and DC feed. The purpose of DC feed may supply enough power to operate the telephonic device 150 at the customer end. The purpose of DC loop supervision is to detect changes in DC load, such as on-hook events, off-hook events, rotary dialing, or any other event that causes the DC load to change. In the interest of clarity, and to avoid obscuring the invention, only that portion of the line card 300 that is helpful to an understanding of the invention is illustrated.

In one embodiment, the line card 300 comprises a subscriber line interface circuit (SLIC) 310, as well as a subscriber line audio-processing circuit (SLAC) 320. The SLIC 310 performs a variety of interface functions between the line card 300 and the communication line 130. The SLIC 310 is also capable of performing a variety of functions, such as battery feed, overload protection, polarity reversal, on-hook transmission, and current limiting. The SLIC 310 is connected to the SLAC 320. The SLAC 320 is capable of processing analog-to-digital (A/D) and digital-to-analog (D/A) signal conversion, filtering, feed control, and supervision.

The line card 300 is capable of performing off-hook detection. The power source 340 provides a fixed voltage when the telephonic device 150 is on-hook, during which time period the telephonic device 150 may draw substantially zero power. The telephonic device 150 is also capable of providing a DC supervisory loop, which monitors the communications 130 line for current flow. The telephonic device 150 may force current (substantially zero when on-hook) to force a signal called VOC (Voltage Operating Circuit) to appear across a tip-node and a ring-node of the line card 300. The VOC signal represents the target voltage to be supplied on the telephone line when the telephonic device 150 is in an "on-hook" mode. In one embodiment, the VOC signal may be a programmable voltage that is generated by the SLIC 310 and/or the SLAC 320. The tip-node voltage ($V_{tip}$) minus the ring-node voltage ($V_{ring}$) is detected by the line card 300. This current signal, filtered by the line card 300, passes to the SLIC part 310 of the line card 150. This current forces the tip-node portion of the signal apart from the ring-node portion of the signal, providing a feedback. This feedback creates a stable operating point for the telephonic device 150. The control current may also be provided to perform current limiting and current sensing function in the line card 300.

When the telephone goes off-hook, a predetermined amount of current may be drawn. This may result in voltage drops on tip-node and the ring-node (i.e., $V_{tip}$ and $V_{ring}$ converge). The state machine may transition through speed-up states to change the power-mode switcher operating mode. The VOC set then no longer controls the $V_{tip}$ and $V_{ring}$ operating points. This operating point may float downward as the electronic device's DC feedback loop drives current into the telephonic device 150. The relating current may build up until the current-set block limits the drive current. The switcher voltage may then become greater than the "Floor Volts Limit" and less than the "Battery Clamp Limit". The exact voltage may be determined by how much control signals are tapped from a current mirror in the IM/supervision path of the line card 150 and fed to a switcher in the SLAC 320. This signal is bounded by the Battery Clamp Limit and the Floor Volt Limit.

A supervision circuit in the SLAC 320 may influence this operation since the "recognition of off-hook" does not strictly require a specific loop current flow, only that the system saturates trying to cause that current to flow. So, if the power supply is unable to create sufficient voltage for the SLAC, the telephonic device 150 may saturate trying to drive the desired loop current. If this path saturates, the telephonic device 150 may remain in an off-hook mode. This may become problematic for an extremely power-limited system like a PC computer system in a sleep-mode state (e.g., a so-called "S3 Standby" state). Some telephone systems may require a relatively high level of current (e.g., 6-13 mA) at a relatively high battery (e.g., 24-56V) to detect off-hook. Therefore, a conventional detector would see an off-hook and immediately go back on-hook. This transition may not be sufficiently long enough for the PC to start waking up. A conventional circuit would require at least 150 mW to detect and maintain the off-hook while the PC wakes up. But the power limit during sleep-mode or standby-mode may be only 150 mW. Hence, for convention circuits, insufficient power may remain for the circuit portion that detects off-hook. The telephonic device 150 of the present invention is capable of overcoming this deficiency.

Figure 4:
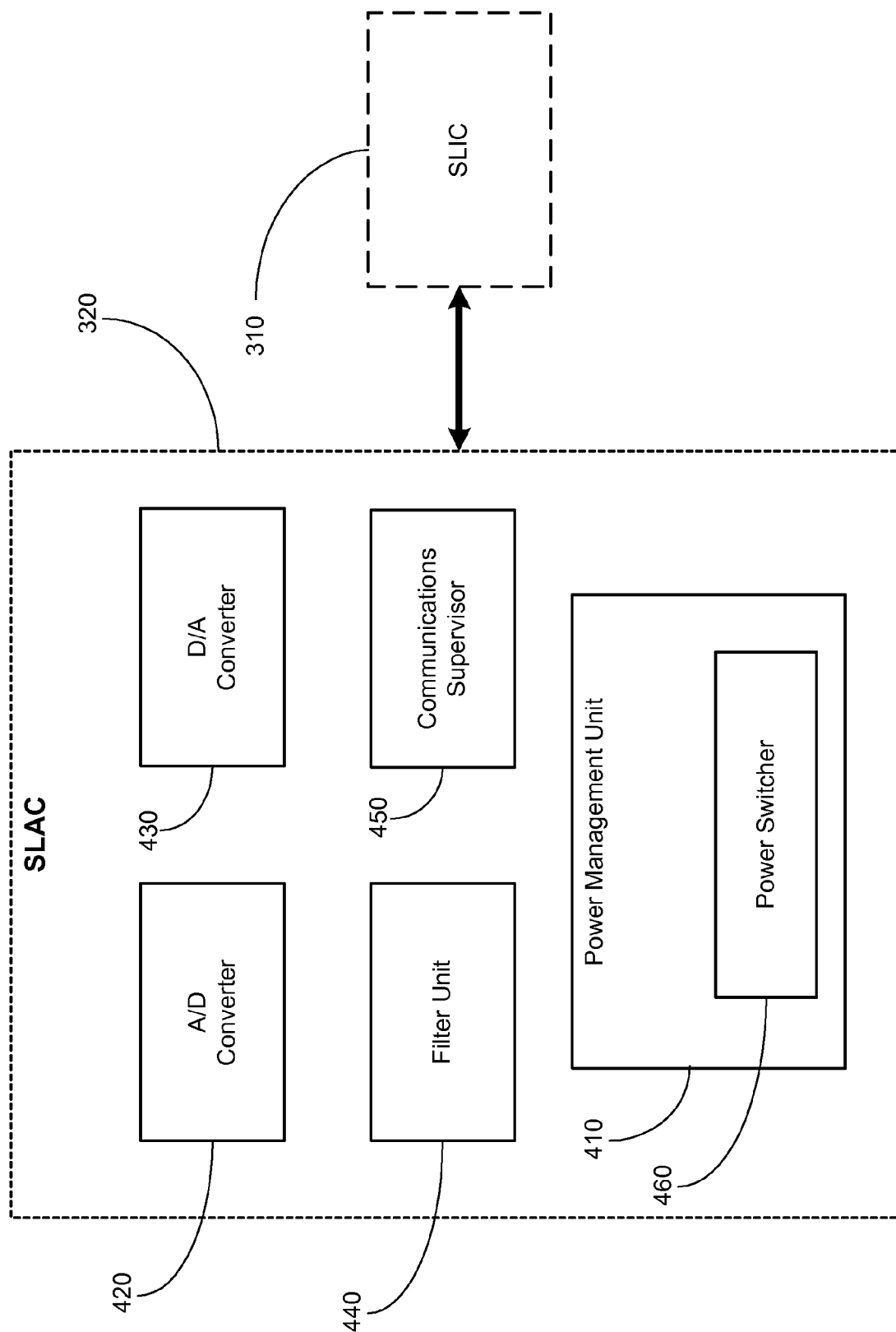
FIG. 4 illustrates a more detailed block diagram depiction of the SLAC portion of a line card of FIG. 3, in accordance with one illustrative embodiment of the present invention.

FIG. 4 depicts a more detailed block diagram depiction of the SLAC 320, in accordance with one illustrative embodiment of the present invention. Referring simultaneously to FIGS. 3 and 4, a supervision circuit (described in FIG. 4 as the communications supervisor 450) in the SLAC 320 of the telephonic device 150 may operate with very relatively low battery voltages and relatively low loop currents. This circuit and the novel power supply provided herein may enable the electronic device 110 to exit the sleep-mode state and transition into a normal-operating state upon detection of an off-hook condition.

The novel switcher circuit (described in FIG. 4 as the power switcher 460) may use the same high power components suitable for 12 Volts operation to generate the on-hook battery from an exemplary 3.3 Volts standby limited power supply. The power switcher 460 may draw its current in pulses. The pulses may have an average power that is less than the 150 mW. Typically, a switcher for 3.3 Volts operation may have much larger amplitude current pulses than one for 12V. To generate 3.3 Watts, the 3.3 Volts power switcher 460 would require an average current of 1 Amp. If the power switcher 460 had to regulate for loads from a few milliwatts to 8 Watts, the duty cycle at 3.3 Watts would be approximately 41%. The 12 Volts power switcher 460 for the same load conditions would have an approximately 275 milliAmperes average current. This may require a duty cycle of about 4.1% to operate the same load. The power switcher 460 may be adapted to accommodate programmable duty cycle limits and programmable frequency. Since the state machine utilized in embodiments of the present invention may acquire data relating to which input supply is being used, and what load range is expected, the operation of the power switcher 460 may be controlled during operations. Those skilled in the art would appreciate that the voltage, current, and power levels described above are for illustrative purposes and that various values may also be used within the context of embodiments of the present invention.

The line card 300 may also comprise a plurality of power sources 340. The power sources 340 may represent various voltage and/or current levels that may be provided by one or more power sources located in the electronic device. Referring again to FIG. 3, a SLAC 320 is capable of utilizing the various power sources 340 to switch operational power in conjunction with the operation of the electronic device 110. A more illustrative embodiment of the SLAC 320 is provided in FIG. 4 and accompanying description herein.

Referring again to FIG. 4, the SLAC 320 may comprise an analog to digital (A/D) converter 420 for performing analog to digital conversion of communication signals. The SLAC 320 may also comprise a digital to analog (D/A) converter 430 to perform conversion of digital to analog conversion of communication signals. Depending upon the type of communications interface 240 being employed by the electronic device 110, various conversions of signals are performed by the SLAC 320. Further, the SLAC 320 may also comprise a filter unit 440. The filter unit 440 may comprise one or more filters, such as band-pass filters, low-pass filter, high-pass filters, etc., to perform various filtering of the communications signals. Further, the SLAC 320 may also comprise the communications supervisor 450 (as described above) that is capable of controlling communications between the external communication device(s) 120 and the telephonic device 150.

The SLAC 320 may also comprise a power management unit 410. The power management unit 410 is capable of switching various power levels to enter various power mode operations of the telephonic device 150 in conjunction with the electronic device 110. The power management unit 410 is also capable of changing the power mode of the electronic device 110 based upon communications received via the communications interface 240. The power management unit 410 may comprise various circuits interfaces and controllers to perform power management functions described herein. In one embodiment, the power management unit 410 comprises a power switcher 460 that is capable of switching the power signal utilized by the telephonic device 150 as well as the electronic device 110. The power management unit 410 may also comprise a power switcher 460 (described above). The power switcher 460 may comprise a plurality of switchers based upon the number of channels handled by the telephonic device 110. For example, the power switcher 460 may represent two switchers for a dual channel communications system that may be provided by the telephonic device 150.

The power switcher 460, in one embodiment, may be normally configured to produce sufficient voltage for line driver operation while off-hook. This, in one embodiment, may be referred to as "tracking operation". While on-hook and in a tracking operation, the power switcher 460 may produce a fixed programmable open circuit voltage. During off-hook, the power switcher 460 may provide an output voltage that is higher than the required difference of a voltage by the line driver's overhead requirement to reduce the possibility of voltage clipping. The overhead voltage may be programmable in various voltage steps, such as four, approximately three, volt steps. In one embodiment, the lowest step may be 2.6 volts and the highest may be approximately a 12 volts step. These steps may be programmed into the power management unit 410. The power switcher 460 may also be capable of tracking the required voltage that may be received by the telephonic device 150 in a sleep-mode state to produce a required tip-ring voltage plus the programmed overhead voltage required for operation.

Figure 5:
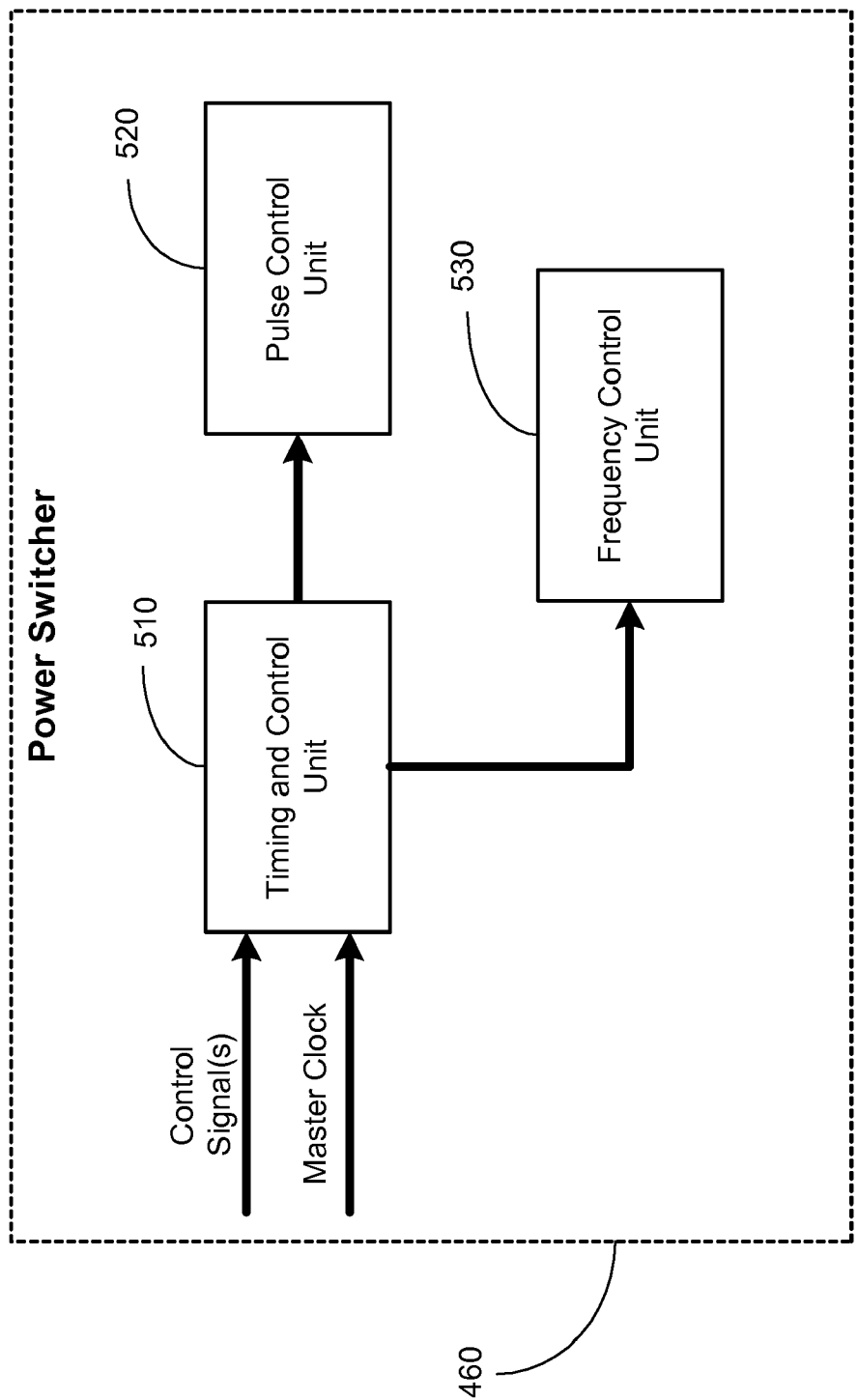
FIG. 5 illustrates a block diagram depiction of a power switcher of FIG. 4, in accordance with one illustrative embodiment of the present invention.

Turning now to FIG. 5, a block diagram depiction of the power switcher 460, in accordance with one illustrative embodiment of the present invention is provided. The power switcher 460 may comprise a timing and control unit 510 that is capable of receiving controlled signals, and to control the operation of the power switcher 460. The timing and control unit 510 may operate based upon a master clock that is associated with the electronic device 110.

The power switcher 460 may also comprise a pulse control unit 520 and a frequency control unit 530. The pulse control unit 520 may be capable of controlling the pulse-width of the power signal that is provided by the SLAC 320. The frequency control unit 530 is capable of controlling the frequency of the power pulses that is provided by the SLAC 320. By controlling the amplitude, pulse width, and/or frequency of the power signal provided by the SLAC 320, efficient switching of power utilized by the telephonic device 150 and the electronic device 110, is provided. In this manner, power efficiency may be realized.

Referring simultaneously to FIGS. 4 and 5, the power switcher 460 may also be configured to run in a fixed output operation for ringing. In this mode, the power switcher 460 provides an output voltage that may be fixed at a programmed value. This value may be changed via communications with the telephonic device 150. The program value may be dependent upon taking into account the programs and their sufficient voltage level for desired operation. For example, the programming of the ringing voltage may be set at a level such that substantially no clipping occurs as the channel may not have control over its supply voltage. The fixed mode operation provided by the power switcher 460 may be used while the electronic device 110 is used as a FXO (foreign exchange office port).

The power management unit 410 is capable of tracking the off-hook voltage and delivering a fixed program voltage for ringing. This may provide the benefit of economical usage of power components in lower ring-voltage systems. The power management unit 410 may provide a plurality of modes of operation. For the sake of clarity and ease of description, an exemplified four modes of operation is described herein. However, those skilled in the art would appreciate that any number of modes of operation may be supported and remain within the spirit and scope of the present invention. The power management unit 410 may also comprise various registers and switchers to perform the controlling of the operation power modes. In one example, the power management unit 410 may provide for operation in a mode 0 or an off mode. The off mode may have several functions. Various variable parameters may be loaded into the timing and control unit 510 of the power switcher 460 during the off-mode. In this mode, the power switcher 460 may provide substantially no output during the off-setting.

The power management unit 410 may also enter a mode 1, i.e., a low power standby/mode (e.g., "S3 mode"). The low power mode may default to a 48 KHz period frequency for a power signal. In one embodiment, the maximum one time pulse of the power signal in this mode may be 1.7 ms. In one embodiment, the default low power mode period may be approximately 20.833 microseconds corresponding to a frequency of 48 kHz. This is based upon the exemplary operating frequency of 24.576 MHz clock divided by 1024 decimal or 04 00$_h$. In this embodiment, the maximum on-time is the time from the start of the ramp to termination of the ramp. A low power mode register in the line card 330 may hold the number of operating frequency (e.g., 24.576 MHz) clock periods such that the output current can flow in the low power mode. In this embodiment, the maximum on-time in the low power mode is 64 times 40.6 nanoseconds, or 2.604 microseconds. This corresponds roughly to a maximum duty cycle of about 12.5%. The default value is a count of 42 decimal or 2Ah. The 42 counts correspond to 1.709 microseconds maximum on-time or 8.2 duty cycle. In this manner, this switching may provide for a power supply that may create voltages between 20 volts and 70 volts with relatively light loading.

The power management unit 410 may also implement a mode 2 i.e., a medium power mode. In one embodiment, the medium power mode may default to a power signal frequency of 96 KHz period. The power signal in this mode, in one embodiment, may comprise a maximum on-time of 1.7 ms. In one embodiment, the default medium power mode period may be approximately 10.417 microseconds, corresponding to a frequency of 96 kHz. This is based upon the exemplary operating frequency of 24.576 clock divided by 256 decimal or 01 00$_h$. The maximum on-time may be the time from the start of the ramp to termination of the ramp. The duty cycle is the ration of the on-time to the period in the mode. A medium power mode on-time register in the line card 300 may hold the number of operating frequency (e.g., 24.576 MHz) clock periods such that the output current can flow in the low power mode. In this embodiment, the maximum on-time in the low power mode is 64 times 40.6 nanoseconds or 2.604 microseconds. This corresponds approximately to a maximum duty cycle of 25%. The default value is a count of 42 decimal or 2 Ah. The 42 counts correspond to 1.709 microseconds maximum on-time or 16.4% duty cycle. In this mode, a power signal is supplied that can create voltages between 30 volts and 90 volts with light and/or moderate loads, in one embodiment.

The power management unit 410 is also capable of entering a mode 3, i.e., a high power mode. In one embodiment, the high power mode may default to a power signal frequency of 384 kHz period. In one embodiment, the power signal in the high power mode may comprise a maximum on-time pulse width of 1.7 ms. In one embodiment, the default high power mode period is 2.604 microseconds corresponding to a frequency of 384 kHz. This is based upon the exemplary operating frequency of 24.576 MHz clock divided by 64 decimal or 00 40$_h$. In this embodiment, the maximum on-time is the time from the start of the ramp to termination of the ramp. The duty cycle is the ratio of the on-time to the period in the mode. A high power mode on-time register may hold the number of 24.576 MHz clock periods that the output current can flow in the low power mode. The maximum on-time in the low power mode is 64 times 40.7 nanoseconds or 2.604 microseconds. This corresponds roughly to a maximum duty cycle of 100%. The default value is a count of 45 decimal. The 45 counts correspond to 1.831 microseconds maximum on-time or 70.3% duty cycle. In one embodiment, in the high power mode, a voltage supply may be created in the range of voltages between 50 volts and 150 volts with moderate and/or heavy loads.

Utilizing embodiments of the present invention, various efficiencies in telephonic device operation may be realized. A telephonic system such as a system that provides for voice over internet protocol (VOIP) communications may be provided by the telephonic device 150 provided in the embodiments of the present invention. The system may be integrated with various electronic devices, such as a PC computer system. The PC computer system, such as a laptop system, may then enter low power or sleep mode while maintaining communication protocols using substantially low power operations. A telephonic system integrated with the electronic device may then provide for power mode shifts, such as shifting from a sleep mode to a wake up mode based upon received data packets that may be addressed to the specific telephonic device. Further, ring signals may also be detected to perform normal telephone operations by waking up the electronic device. The power switching provided for controlling various parameters of the power signal, such as frequency and pulse width, provides for efficient power operations while maintaining the flexibility to adjust to various power operation modes.

Although for illustrative purposes, embodiments of the present invention have been discussed in the context of line card applications, the amplifier arrangements taught by embodiments of the present invention is not limited to line card applications. The concepts taught by embodiments of the present invention may be utilized in a variety of electronic applications. The apparatuses of embodiments of the present invention may be integrated in a system capable of transmitting and receiving signals having a voice band and/or a data band. The teachings of the present invention may be implemented in a line card that supports POTS technology, ADSL technology, and/or similar technologies. The teachings of the present invention may also be implemented in various other electronics applications.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
   detecting an off-hook condition, wherein detecting said off-hook condition comprises determining whether a received data packet is addressed to a telephonic device associated with an electronic device;
   determining a power level for said operation of said electronic device based upon said detecting said off-hook condition, determining said power level comprising determining at least one of a frequency parameter and a pulse-width parameter of a power signal; and
   providing said power signal for an operation of said electronic device based upon said determined power level.

2. The method of claim 1, further comprising receiving a tip and a ring signal to perform said detecting of said off-hook condition.

3. The method of claim 1, wherein determining said power level for an operation of said electronic device based upon said detecting said off-hook condition further comprises causing said electronic device to enter a wake-up mode from a sleep mode based upon said detecting said off-hook condition.

4. The method of claim 1, wherein determining said power level for an operation of said electronic device further comprises determining at least one of an off-power mode, a low-power mode, a medium power mode, and a high power mode.

5. The method of claim 4, wherein providing said power signal for an operation of said electronic device based upon said determined power level comprises providing said power signal in said low power mode that comprises a frequency of about 24.6 MHz, a pulse width of about 1.7 microseconds, and a voltage level in the range of about 20 Volts to about 70 Volts.

6. The method of claim 4, wherein providing said power signal for an operation of said electronic device based upon said determined power level comprises providing said power signal in said medium power mode that comprises a frequency of about 24.6 MHz, a pulse width of about 1.7 microseconds, and a voltage level in the range of about 30 Volts to about 90 Volts.

7. The method of claim 4, wherein providing said power signal for an operation of said electronic device based upon said determined power level comprises providing said power signal in said high power mode that comprises a frequency of about 24.6 MHz, a pulse width of about 1.7 microseconds, and a voltage level in the range of about 50 Volts to about 150 Volts.

8. An apparatus, comprising:
   a telephonic device operationally coupled to an electronic device, said telephonic device to detect an off-hook status associated with said telephonic device, wherein detecting said off-hook condition comprises determining whether a received data packet is addressed to said telephonic device associated with said electronic device, said telephonic device to determine at least one of a frequency parameter and a pulse-width parameter of a power signal used for an operation of said electronic device based upon said off-hook indication, the telephonic device to also provide said power signal for an operation of said electronic device.

9. The apparatus of claim 8, wherein said telephonic device is integrated into said electronic device.

10. The apparatus of claim 8, wherein said electronic device is a computer system and said telephonic device is configured as a peripheral device of said computer system.

11. The apparatus of claim 8, wherein said telephonic device comprises a power switcher for switching between a plurality of power modes of said power signal.

12. The apparatus of claim 11, wherein said plurality of power modes comprise an off-power mode, a low-power mode, a medium power mode, and a high power mode.

13. The apparatus of claim 12, wherein low power mode comprises a power signal with a frequency of about 24.6 MHz, a pulse width of about 1.7 microseconds, and a voltage level in the range of about 20 Volts to about 70 Volts, wherein said medium power mode comprises a power signal with a frequency of about 24.6 MHz, pulse width of about 1.7 microseconds, and a voltage level in the range of about 30 Volts to about 90 Volts, and wherein said high power mode comprises a power signal with a frequency of about 24.6 MHz, pulse width of about 1.7 microseconds, and a voltage level in the range of about 50 Volts to about 150 Volts.

14. The apparatus of claim 8, wherein said telephonic device comprises a line card, said line card comprising a subscriber line interface circuit (SLIC) and a subscriber line audio-processing circuit (SLAC), wherein said SLAC comprises a power management unit for controlling at least one parameter of said power signal, said parameter being at least one of a signal frequency and a pulse width of said power signal.

15. The apparatus of claim 14, wherein said subscriber line interface circuit (SLIC) and said subscriber line audio-processing circuit (SLAC) are integrated into an integrated circuit (IC) device.

16. A system, comprising:
an electronic device capable of receiving a communication signal through a communication line;
a telephonic device operationally coupled to said electronic device, said telephonic device to detect an off-hook indication of said communication signal, wherein detecting said off-hook condition comprises determining whether a received data packet is addressed to said telephonic device associated with said electronic device, said telephonic device to determine at least one of a frequency parameter and a pulse-width parameter of a power signal used for an operation of said electronic device based upon said off-hook indication, the telephonic device to also provide said power signal for an operation of said electronic device.

17. The system of claim 16, wherein said communication signal comprises a tip signal and a ring signal.

18. The system of claim 16, wherein communication signal comprises a voice over internet protocol signal comprising at least one data packet directed to said electronic device.

19. The system of claim 16, wherein said electronic device is one of a desktop computer system, a laptop computer system, a personal digital assistant (PDA), and a remote communication device.

20. The system of claim 16, wherein said telephonic device comprises a power switcher for switching between at least one of an off-power mode, a low-power mode, a medium power mode, and a high power mode.

21. The system of claim 20, wherein low power mode comprises a power signal with a frequency of about 24.6 MHz, a pulse width of about 1.7 microseconds, and a voltage level in the range of about 20 Volts to about 70 Volts, wherein said medium power mode comprises a power signal with a frequency of about 24.6 MHz, pulse width of about 1.7 microseconds, and a voltage level in the range of about 30 Volts to about 90 Volts, and wherein said high power mode comprises a power signal with a frequency of about 24.6 MHz, pulse width of about 1.7 microseconds, and a voltage level in the range of about 50 Volts to about 150 Volts.

22. The system of claim 16, wherein said telephonic device comprises a line card, said line card comprising a subscriber line interface circuit (SLIC) and a subscriber line audio-processing circuit (SLAC), wherein said SLAC comprises a power management unit for controlling at least one parameter of said power signal, said parameter being at least one of a signal frequency and a pulse width of said power signal.

23. The system of claim 22, wherein said electronic device comprises a printed circuit (PC) board and wherein said SLAC is integrated onto said PC board.

24. The system of claim 16, wherein said communication line is at least one of a subscriber line, an internet communications line, a local area network (LAN) line, a wide area network (WAN) line, and a wireless communication line.

25. An apparatus, comprising:
means for detecting an off-hook condition, wherein means for detecting said off-hook condition comprise means for determining whether a received data packet is addressed to a telephonic device associated with an electronic device;
means for determining a power level for an operation of said electronic device based upon said detecting said off-hook condition, said means for determining said power level comprising means for determining at least one of a frequency parameter and a pulse-width parameter of a power signal; and
means for providing said power signal for an operation of said electronic device based upon said determined power level.

26. A computer readable program storage device encoded with instructions that, when executed by a computer, performs a method, comprising:
detecting an off-hook condition, wherein detecting said off-hook condition comprises determining whether a received data packet is addressed to a telephonic device associated with an electronic device;
determining a power level for said operation of said electronic device based upon said detecting said off-hook condition, determining said power level comprising determining at least one of a frequency parameter and a pulse-width parameter of a power signal; and
providing said power signal for an operation of said electronic device based upon said determined power level.

27. The computer readable program storage device encoded with instructions that, when executed by a computer, performs the method of claim 26, wherein determining said power level for an operation of said electronic device based upon said detecting said off-hook condition further comprises causing said electronic device to enter a wake-up mode from a sleep mode based upon said detecting said off-hook condition.

* * * * *